(12) United States Patent  
Takemoto et al.

(10) Patent No.: US 6,986,152 B2  
(45) Date of Patent: Jan. 10, 2006

(54) OPTICAL INFORMATION RECORDING MEDIUM

(75) Inventors: Hiroyuki Takemoto, Miyagi (JP); Mitsuo Arima, Miyagi (JP); Tadao Suzuki, Miyagi (JP); Yoshihito Fukushima, Miyagi (JP); Hiroshi Nakayama, Miyagi (JP); Atsushi Takeuchi, Miyagi (JP)

(73) Assignee: Sony Corporation, Tokyo (JP)

( * ) Notice: Subject to any disclaimer, the term of this patent is extended or adjusted under 35 U.S.C. 154(b) by 29 days.

(21) Appl. No.: 10/344,700

(22) PCT Filed: Jun. 26, 2002

(86) PCT No.: PCT/JP02/06445

§ 371 (c)(1),  
(2), (4) Date: Oct. 8, 2003

(87) PCT Pub. No.: WO03/005353

PCT Pub. Date: Jan. 16, 2003

(65) Prior Publication Data

US 2004/0066732 A1    Apr. 8, 2004

(30) Foreign Application Priority Data

Jul. 2, 2001    (JP) .............................. 2001-200498

(51) Int. Cl.  
*G11B 7/24*    (2006.01)

(52) U.S. Cl. .................................................. 720/718

(58) Field of Classification Search ................ 720/718; 360/131, 135; 369/286, 283, 272.1  
See application file for complete search history.

(56) References Cited

U.S. PATENT DOCUMENTS

| 5,216,665 A * | 6/1993 | Imataki ...................... 369/279 |
| 5,347,510 A * | 9/1994 | Hirokane et al. ......... 369/275.5 |
| 6,177,175 B1 * | 1/2001 | Hashimoto .................. 428/141 |
| 6,501,728 B2 * | 12/2002 | Koizumi et al. ......... 369/275.4 |
| 6,671,233 B1 * | 12/2003 | Shimazaki et al. ...... 369/13.07 |

FOREIGN PATENT DOCUMENTS

| EP | 1 406 253 A1 | 4/2004 |
| JP | 05-054440 | 3/1993 |
| JP | 05-250742 | 9/1993 |
| JP | 09-161336 | 6/1997 |
| JP | 10-064131 | 3/1998 |
| JP | 11-195252 | 7/1999 |
| JP | 11-353711 | 12/1999 |
| JP | 2000-293901 | 10/2000 |
| JP | 2001-126328 | 5/2001 |

* cited by examiner

*Primary Examiner*—Julie Anne Watko  
(74) *Attorney, Agent, or Firm*—Oblon, Spivak, McClelland, Maier & Neustadt, P.C.

(57) ABSTRACT

An optical information recording medium, which includes both of a land surface and a groove surface as a recording track and presents high signal quality. The optical information recording medium includes both a land and a groove as the recording track on a substrate, in which a laser light is irradiated from a reverse side of the substrate to thereby carry out a recording and a reproduction, and an inclination angle of a groove side is 25° or more and 40° or less, and both of arithmetic average roughness (Ra) on the land surface and the groove surface are assumed to be 0.2 to 0.7 nm.

3 Claims, 5 Drawing Sheets

OPTICAL INFORMATION RECORDING MEDIUM

This application is a 371 of PCT/JP02/06445 Jun. 26, 2002.

TECHNICAL FIELD

The present invention relates to an optical information recording medium, and more specifically, to an optical information recording medium including both a land and a groove as a recording track.

BACKGROUND ART

An optical information recording medium (hereafter, abbreviated as an optical disc), which is rewritable and removable, has been widely used as a file storage for a personal computer. In order to cope with such demand, various techniques to increase a recording capacity have been developed. As a method of increasing the recording capacity, there is a method of increasing a recording density in a radial direction and a circumferential direction.

As the method of increasing the recording density in the radial direction, there is a land groove recording format in which both of a land (a flat portion) and a groove (a trench portion) are used as a recording track. This method is the method of increasing the recording density by using both of the land and the groove as the recording track, although only one of the land and the groove has been conventionally used as the recording track.

In this land groove recording method, CNR (Carrier to Noise Ratio), a jitter or a crosstalk, which indicates a single signal quality of each of the land and the groove, becomes problematic. Moreover, an influence of a crosstalk between signals recorded on tracks adjacent to each other, namely, from the groove adjacent to the land, or a crosstalk from a signal recorded on the land adjacent to the groove is induced.

Also typically, in the land groove recording, there is a difference of a crosstalk property between a land track that is concave in the sight of an incident surface of a reproducing laser and a groove track that is convex. In addition, there is a difference between a signal amount leaking to the groove from the land and a signal amount leaking to the land from the groove, thus complex designs have been carried out upon taking into account such problems.

Also, as the land and the groove are close to each other as the recording tracks, the phenomena of the CNR and the jitter become further complex.

On the other hand, as the method of increasing the recording density in the circumferential direction, there is a Magnetically Induced Super Resolution (MSR). This is the technique of reading out a recording mark, which is recorded finer than a diffractive limit of a reproduction light, through a magnetically formed opening on an upper layer (a so-called reproduction layer). This technique enables the marks adjacent to each other at the diffractive limit or less to be separated and read out.

However, if this land groove recording and the MSR are combined, the crosstalk and the jitter in both tracks of the land and the groove and the magnetic property of the MSR provide the relation of trade-off. Since there is neither a design technique that simultaneously satisfies all of them, nor an optimal design technique, this problem is difficult to be solved. Partially, for example, the crosstalk is considered to be related to an inclination angle between the land and the groove, and the jitter and the magnetic property of the MSR are considered to be caused by arithmetic average roughness on a land surface and a groove surface, and a shape of the pattern. However, the optimal combination of them or a controllable parameter has not been achieved yet.

Also, since the above-mentioned optimal combination has not been obtained, an original disc of an optical information recording medium to manufacture the optical information recording medium and a method of manufacturing the same are not obtained.

The present invention is proposed in view of the above-mentioned circumstances and, therefore, an object of the present invention is to provide an optical information recording medium which includes both a land and a groove as a recording track and has a high signal quality.

DISCLOSURE OF THE INVENTION

The above-mentioned subject can be attained through an optical information recording medium, an original disc of an optical information recording medium and a method of manufacturing the same, according to a preferred embodiment of the present invention, which will be described below.

(1) In other words, an optical information recording medium according the present invention is an optical information recording medium including both a land and a groove as a recording track on a substrate, characterized in that an inclination angle of a groove side of the substrate is 25° or more and 40° or less, and both of arithmetic average roughness (Ra) on a land surface and a groove surface of the substrate is 0.2 to 0.7 nm. The optical information recording medium having the above-mentioned configuration is optimum in signal quality property, namely, optimum in jitter, erasability and crosstalk property.

In the optical information recording medium noted in the above mentioned (1), a difference between the arithmetic average roughness (Ra) on the land surface and the groove surface is desired to be 0.2 nm or less. The optical information recording medium having the above-mentioned configuration is optimum in magnetic balance between the land and the groove and optimum in signal quality property.

In the optical information recording medium noted in the above mentioned (1), a reproduction of information is carried out by using a Magnetically Induced Super Resolution (MSR). In the optical information recording medium having the above-mentioned configuration, the usage of the MSR enables the recording of a higher density to be done at a satisfactory signal quality property.

(2) Also, the present invention includes an original disc of an optical information recording medium to transfer and produce a substrate for an optical information recording medium including both a land and a groove as a recording track, characterized in that an inclination angle of an original disc surface corresponding to the groove side is 25° or more and 40° or less, and both of arithmetic average roughness (Ra) on original disc surfaces corresponding to the land surface and the groove surface is 0.2 to 0.7 nm. The original disc for the optical information recording medium having the above-mentioned configuration enables a duplication of the optical information recording medium having an optimum signal quality.

(3) A manufacturing method of an original disc of an optical information recording medium according to a preferred embodiment of the present invention includes a manufacturing method of an original disc of an optical information recording medium, which transfers and produces a substrate for an optical information recording medium including both a land and a groove as a recording track, characterized by including: a step of producing shapes of the land and the groove on an original disc material surface; and a step of performing a plasma etching process on the original disc material surface, on which the shapes of the land and the groove are formed, and setting an inclination angle of an original disc surface corresponding to the groove side to 25° or more and 40° or less, and then setting both of arithmetic average roughness (Ra) on original disc surfaces corresponding to the land surface and the groove surface to 0.2 to 0.7 nm. Due to the manufacturing method of the original disc for the optical information recording medium as mentioned above, it is possible to manufacture the original disc for the optical information recording medium which enables the duplication of the optical information recording medium having the optimum signal quality property.

Also, the manufacturing method of the original disc for the optical information recording medium noted in the above mentioned (3) is characterized in that a plasma generation gas at the plasma etching process step is Ar, $N_2$, He or $O_2$. Moreover, in the manufacturing method of the original disc for the optical information recording medium noted in the above mentioned (3), a difference between the arithmetic average roughness (Ra) on the land surface and the groove surface is desired to be 0.2 nm or less. Due to the manufacturing method of the original disc for the optical information recording medium as mentioned above, it is possible to arrange the arithmetic average roughness on the land surface and the groove surface under good balance, and also possible to manufacture the original disc for the optical information recording medium to duplicate the optical information recording medium having the optimum signal quality property.

BEST MODE FOR CARRYING OUT THE INVENTION

An optical information recording medium (hereafter, abbreviated as an optical disc) according to a preferred embodiment of the present invention is designed so as to include both of a groove (a trench) and a land as a recording track on a substrate and radiate a laser light from a erasability side of the substrate and then carry out a recording and a reproduction.

An example of an optical disc according to a preferred embodiment of the present invention will be described below with reference to the drawings. However, the optical disc according to a preferred embodiment of the present invention is not limited to an embodiment and an implementation. That is, the optical disc according to a preferred embodiment of the present invention can be applied to an optical disc in which a groove and a land are formed as a recording track on a substrate. For example, in addition to a magneto-optic disc, it may be an optical disc dedicated to a reproduction, in which a predetermined finely concave convex pattern corresponding to a recording signal is formed on a signal recording layer, or an optical disc of a phase change type or utilizing pigment or the like.

First Embodiment

Figure 1:
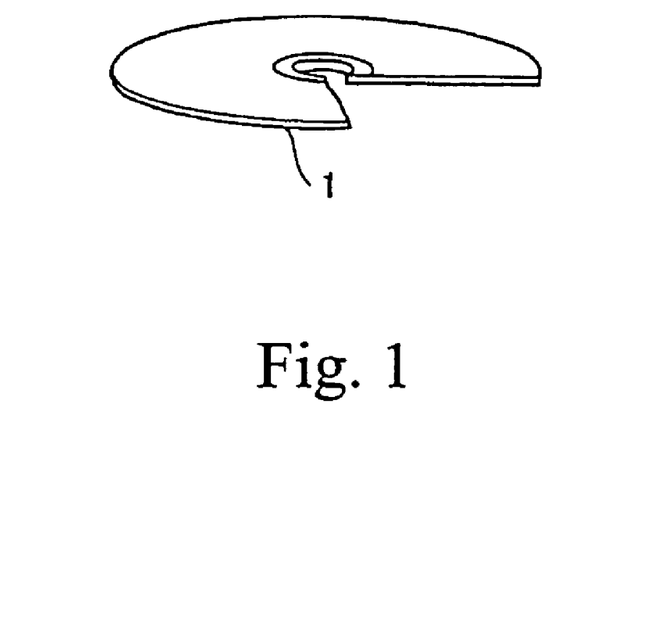
FIG. 1 is a partially cut perspective view of an example of an optical information recording medium according to a preferred embodiment of the present invention.

FIG. 1 is a partial cut perspective view of an optical information recording medium 1 (hereafter, abbreviated as an optical disc) according to a preferred embodiment of the present invention. The optical disc 1 according to a preferred embodiment of the present invention is designed so as to enable a recording signal to be recorded and reproduced a plurality of times. For example, it is accommodated in a disc cartridge (not shown) and detachably used for a recording/reproducing apparatus (not shown).

Figure 2:
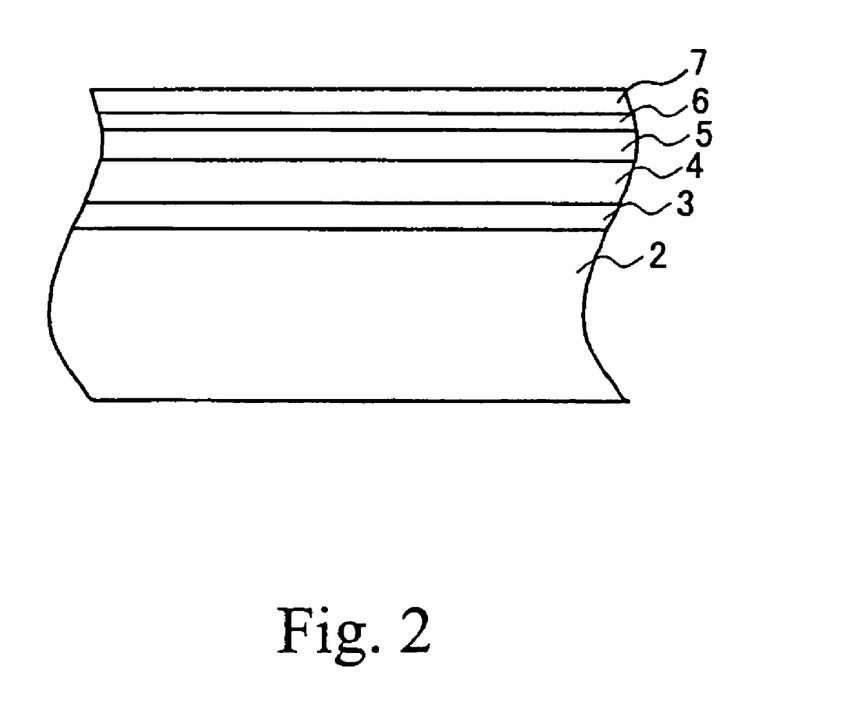
FIG. 2 is a schematic cross-sectional view of an example of an optical information recording medium according to a preferred embodiment of the present invention.

As shown in FIG. 2, the optical disc 1 according to a preferred embodiment of the present invention is designed such that a first dielectric layer 3, a signal recording/reproducing layer 4, a second dielectric layer 5, a thermally diffusing layer 6 and a protective layer 7 are sequentially laminated on a transparent disc substrate 2. The signal recording/reproducing layer 4 is composed of a reproducing layer, a middle layer and a recording layer.

Figure 3:
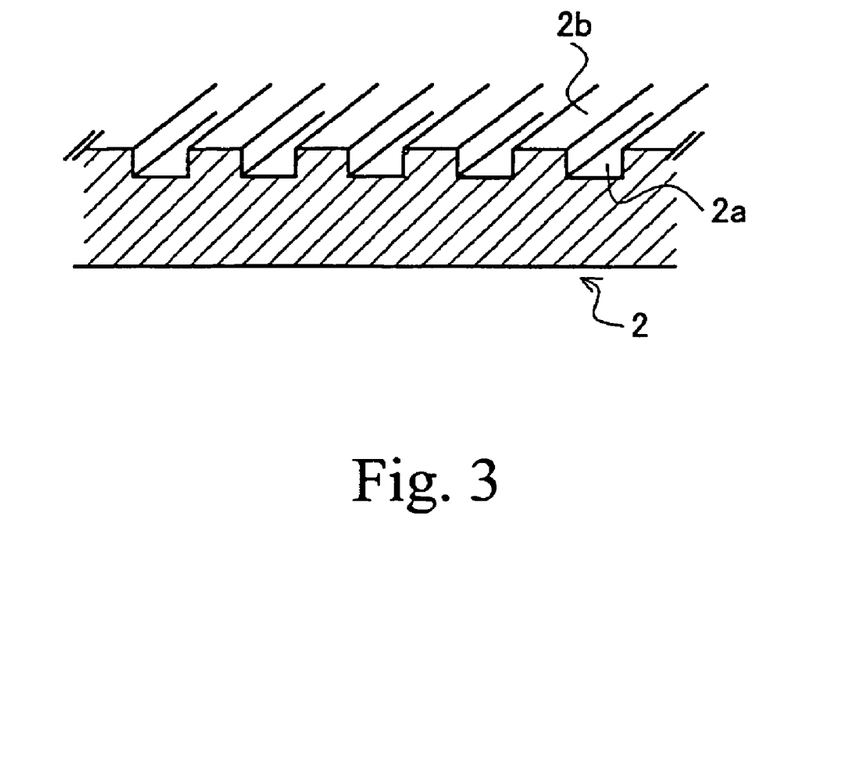
FIG. 3 is a partial schematic perspective view of a transparent disc substrate of an optical information recording medium according to a preferred embodiment of the present invention.

On the transparent disc substrate 2, as shown in FIG. 3, grooves 2a whose sections are grooved and lands 2b whose sections are trapezoidal are spirally formed in a circumferential direction. Consequently, the optical disc 1 is configured such that the recording signal is recorded and reproduced along the grooves 2a and the lands 2b.

In the transparent disc substrate 2, a recording track through which the recording signal is recorded and reproduced is formed along the groove 2a Then, the signal recording on both of the groove and the land is done, in the transparent disc substrate 2 according to a preferred embodiment of the present invention.

Figure 4:
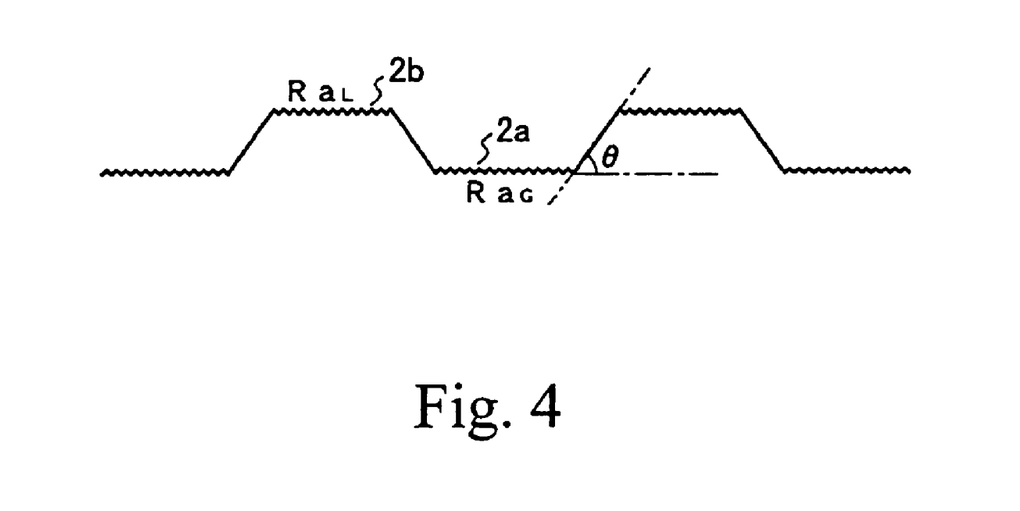
FIG. 4 is a partial schematic cross-sectional view of a transparent disc substrate of an optical information recording medium according to a preferred embodiment of the present invention.

FIG. 4 is a view schematic showing an enlarged section of the land-groove shape of FIG. 3. In FIG. 4, $Ra_L$ and $Ra_G$ indicate a arithmetic average roughness on a land surface and a arithmetic average roughness on a groove surface, respectively. An inclination angle θ of a groove side is an angle between the groove side and a horizontal surface of the transparent disc substrate 2. Here, the inclination angle θ of the groove side is 25° or more, and the arithmetic average roughness $Ra_L$ on the land surface and the arithmetic average roughness on the groove surface $Ra_G$ are both between 0.2 and 0.7 nm.

According to a preferred embodiment of the present invention, the arithmetic average roughness (Ra) is the value in which only a standard length (l) is extracted from a roughness curve in a direction of its average line, and the absolute values of deviations from the average line of the extracted portion to a measurement curve are totaled and averaged. It is calculated from the following equation.

Also, in this embodiment, in the optical disc 1 having the above-mentioned configuration, the reproduction of information was done by using the Magnetically Induced Super Resolution (MSR).

The optical disc 1 was formed by sequentially forming the first dielectric layer 3, the signal recording/reproducing layer 4, the second dielectric layer 5, the thermally diffusing layer 6 and the protective layer 7 on the transparent disc substrate 2 having the above-mentioned configuration by using a typical method, as shown in FIG. 2. For example, the first dielectric layer 3, the signal recording/reproducing layer 4, the second dielectric layer 5 and the thermally diffusing layer 6 were formed by using a sputtering method, and the protective layer 7 was formed by using a spin coating method.

Here, as for thicknesses of the respective layers, the substrate was defined as 1.2 mm, and the first dielectric layer 3 (SiN) was defined as 80 nm. The signal recording/reproducing layer 4 is composed of the reproducing layer (GdFeCo) 40 nm, the middle layer (GdFe) 30 nm and the recording layer (TbFeCo) 50 nm. Also, the second dielectric layer 5 (SiN) was defined as 20 nm, the thermally diffusing layer 6 (AlTi) was defined as 10 nm, and the protective layer 7 (ultraviolet curing resin) was defined as 10 μm.

The signal recording/reproducing layer 4 constituting the optical disc 1 includes an optically magnetically recording layer in this embodiment. The optically magnetically recording layer may be formed as a single layer, or may be formed as a multiple-layer structure. Also, the concave convex shapes of the grooves 2a and the lands 2b in the transparent disc substrate 2 are transferred to the signal recording/reproducing layer 4.

Figure 5:
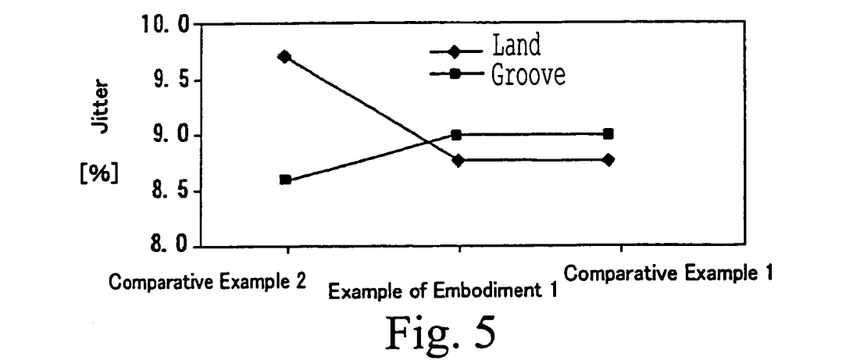
FIG. 5 is a graph showing jitter properties of an example of embodiment 1 and comparison examples 1 and 2.
Figure 6:
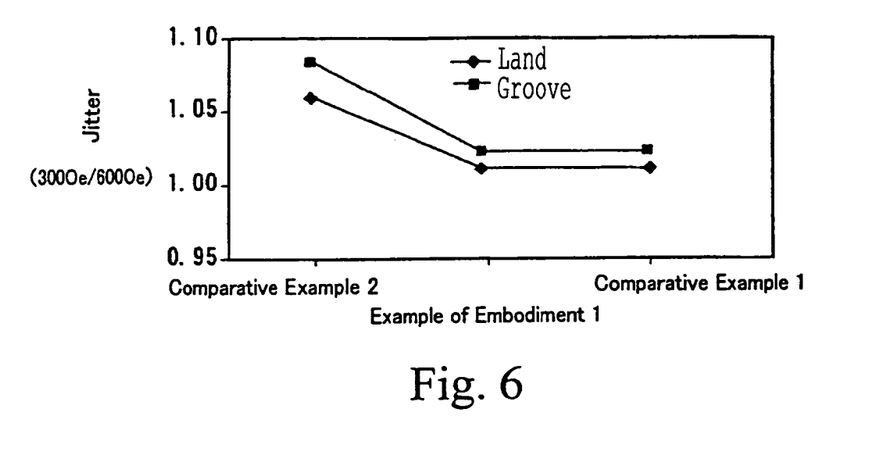
FIG. 6 is a graph showing erasability of the example of embodiment 1 and the comparison examples 1 and 2.
Figure 7:
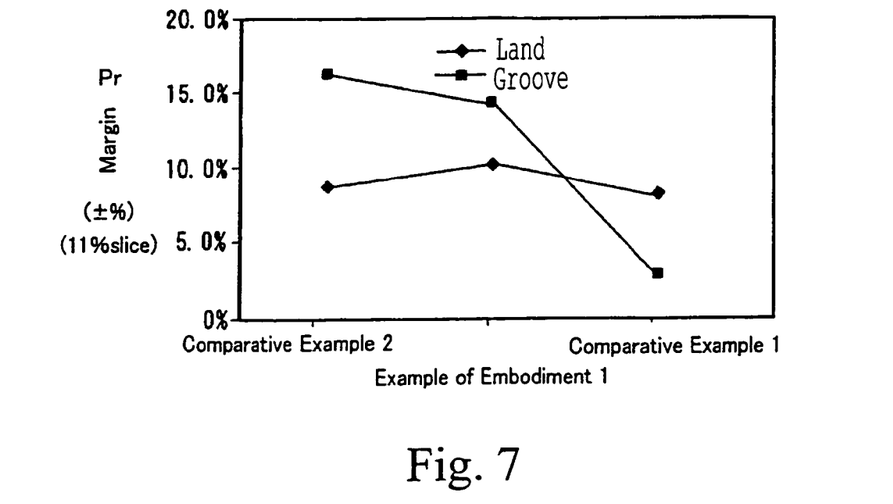
FIG. 7 is a graph showing power margin properties of the example of embodiment 1 and the comparison examples 1 and 2.

The disc substrate having the arithmetic average roughness on the land surface and the groove surface and the inclination angle of the groove side as shown in a table 1 was used to carry out an experiment to evaluate the jitters, the erasability and the power margin properties, as indicated by the graphs in FIGS. 5 to 7. The experiment was done under the condition of the same film configurations. Here, the comparative example 2 was the conventional product.

TABLE 1

| Sample | Arithmetic average roughness of land surface | Arithmetic average roughness of groove surface | Inclination angle of groove side surface |
|---|---|---|---|
| Example of embodiment 1 | 0.6 nm | 0.55 nm | 25° |
| Comparative example 1 | 0.7 nm | 0.65 nm | 19° |

TABLE 1-continued

| Sample | Arithmetic average roughness of land surface | Arithmetic average roughness of groove surface | Inclination angle of groove side surface |
|---|---|---|---|
| Comparative example 2 | 0.8 nm | 0.4 nm | 40° |

FIG. 5 shows the jitters in the respective examples, FIG. 6 shows the erasability, and FIG. 7 shows the power margin properties. Here, the power margin property indicates a level of difficulty of occurrence of crosstalk. As for the experiment conditions, as the conditions common to all items, a wavelength of a reading laser light is 650 nm, NA (Numerical Aperture) is 0.55, and a line velocity is 7.5 m per second.

(I) The experiment with regard to the jitter was done with the following steps.
1. Erase the records on the land and the grooves on both ends thereof.
2. Perform a random recording on the land at an optimal condition, reproduce at the optimal condition and measure the jitter (the optimal condition implies the condition that the value of the jitter becomes minimum).

The above-mentioned steps 1, 2 may be done by replacement by the following steps 1', 2' in which the land and the groove are respectively exchanged at the respective steps.
1'. Erase the records on the groove and the lands on both ends thereof.
2'. Perform a random recording on the groove at an optimal condition, reproduce at the optimal condition and measure the jitter (the optimal condition implies the condition that the value of the jitter becomes minimum).

The experiment result is as shown in FIG. 5.

(II) The experiment of the erasability was done at the following steps.
1. Erase the records on the land and the grooves on both ends thereof.
2. Record on the land at an optimal power.
3. Reproduce at an optimal reproduction power and measure the jitter (this is assumed to be a jitter 600).
4. Erase at a maximum erasure magnetic field (600 Oe) and then record at the optimal power.
5. Erase at a erasure magnetic field (300 Oe) and then record at the optimal power.
6. Reproduce at the optimal reproduction power and measure the jitter (this is assumed to be a jitter 300).
7. Measure an erasure rate at (Jitter 300/Jitter 600).

The above-mentioned steps 1, 2 may be done by replacement by the following steps 1', 2' in which the land and the groove are respectively exchanged at the respective steps.
1'. Erase the records on the groove and the lands on both ends thereof.
2'. Record on the groove at the optimal power.

The experiment result is as shown in FIG. 6.

(III) The experiment with regard to the power margin property was done at the following steps.
1. Erase the records on the land and the grooves on both ends thereof.
2. Record on the land at the optimal condition.
3. Record on the grooves on both ends by increasing an optimally recording power by 5%.
4. Shift 5% of (Radial Tilt=3.5 mrad, Detrack=Track Pitch), and measure the following items.
5. Change a reproduction power at the land, reproduce and measure the jitter.

6. Measure from a falling edge (Prmin) of the jitter to a rising edge (Prmax) of the jitter.
7. Define Prmargin={(Prmax−Prmin)/Prmin}×100% as an XT margin.
8. The rising edge of the jitter and the falling edge are assumed to be a value when the jitter value falls below 11%.

The above-mentioned steps 1, 2, 3 and 5 may be done by replacement by the following steps 1', 2', 3' and 5' in which the land and the groove are respectively exchanged at the respective steps.

1'. Erase the records on the groove and the lands on both ends thereof.
2'. Record on the groove at the optimal condition.
3'. Record on the lands on both ends by increasing an optimally recording power by 5%.
5'. Change a reproduction power at the groove, reproduce and measure the jitter.

The experiment result is as shown in FIG. 7.

The experiment results of FIGS. 5 to 7 are examined as follows.

As for the jitter, as shown in FIG. 5, with regard to the jitters of the lands and the grooves in the example of embodiment 1 and the comparative example 1, it is known that both of the jitters of the lands and the grooves are harmonically reduced to low values.

On the contrary, in the comparative example 2, although the jitter in the groove is low, the jitter in the land is high. Thus, it is not said that both are in harmony. The above-mentioned unbalanced jitter property is not suitable for the case when both of the land and the groove are used as the recording track.

In the comparative example 1, it may be considered that the improvement of the arithmetic average roughness on the land surface leads to a good balance to the arithmetic average roughness on the groove surface.

From the viewpoint of the erasability shown in FIG. 6, it is known that in the example of embodiment 1 and the comparative example 1, those of the lands and the grooves are suppressed as compared with the comparative example 2. For this reason, namely, the reason why plasma etching leads to the improvement of the arithmetic average roughness on the land surface and irrespectively of the deterioration in the arithmetic average roughness on the groove surface, the reason of the improvement of the erasability is improved is unclear in detail. However, this may be inferred from the fact that the erasability is improved since it becomes at a plane state at which a magnetization inversion is easily done.

FIG. 7 shows the power margin property and indicates the resistance against the crosstalk. As for the inclination angle θ of the groove side, it may be typically inferred that as it becomes gentler, the crosstalk is increased to thereby drop the reading performance, namely, reduce the power margin. However, according to the experiment result of the example of embodiment 1, when the inclination angle of the groove side is 25°, the power margin is kept without any deterioration. Then, it is said that the balance between both of the land and the groove is kept. On the contrary, when the inclination angle of the groove side in the comparative example 1 is 19°, the power margin is largely deteriorated.

When the above-mentioned results are qualitatively summarized, they are represented through the following table 2.

TABLE 2

| Sample | Jitter | Erasability | Power margin property |
| --- | --- | --- | --- |
| Example of embodiment 1 | ◯ | ◯ | ◯ |
| Comparative example 1 | ◯ | ◯ | X |
| Comparative example 2 | Δ | Δ | ◯ |

From the above-mentioned experiment, according to the example of embodiment 1, it was known that the control of the shape on the recording surface, namely, the shape of the transparent disc substrate enabled the following advantages to be obtained in the magnetic property of the optical disc.
1. The jitter on the land surface is improved and the balance between both of the land and the groove is improved.
2. The erasability is improved in both of the land surface and the groove surface.
3. The power margin properties on the land surface and the groove surface can be maintained without any deterioration.

In other words, due to the embodiment according to the preferred embodiment of the present invention, the control of the shapes of the groove and the land on the substrate enables the crosstalk, the jitter and the magnetic property in the tracks of both of the land and the groove to be simultaneously satisfied, which was difficult with the conventional techniques.

Second Embodiment

The optical information recording medium 1 according to another preferred embodiment of the present invention can be produced by using the transparent disc substrate 2 having the above-mentioned shape. However, this disc substrate can be obtained by manufacturing and using an original disc of an optical information recording medium, which will be described below. This is because even the shape (the inclination angle and the arithmetic average roughness) of the optical disc after it is molded is similar to a stamper (original disc).

In other words, the manufacturing method of the original disc for the optical information recording medium is the manufacturing method of the original disc for the optical information recording medium, which transfers and produces a substrate for the optical information recording medium that has both a land and a groove as a recording track. It is characterized by including: a step of producing the shapes of the land and the groove on an original disc material surface; and a step of performing a plasma etching process on the original disc material surface, on which the shapes of the land and the groove are formed, and setting an inclination angle of an original disc surface corresponding to the groove side to 25° or more and 40° or less, and then setting both of the arithmetic average roughness (Ra) on the original disc surfaces corresponding to the land surface and the groove surface to 0.2 to 0.7 nm.

This manufacturing method of the original disc for the optical information recording medium will be described below with reference to FIGS. 8A to 8I. This method is provided with the following steps.

Figure 8A:
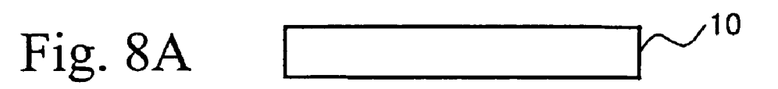
FIGS. 8A to 8I are step-by-step cross-sectional views showing a manufacturing method of an original disc of an optical information recording medium according to a preferred embodiment of the present invention.

At first, a surface of a glass plate 10 serving as a source to produce an original disc is polished and washed (FIG.

Figure 8B:
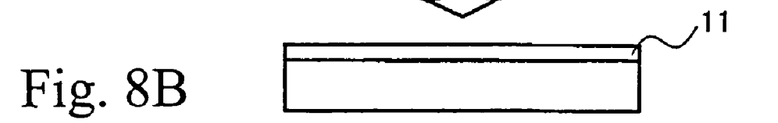
Figure 8C:
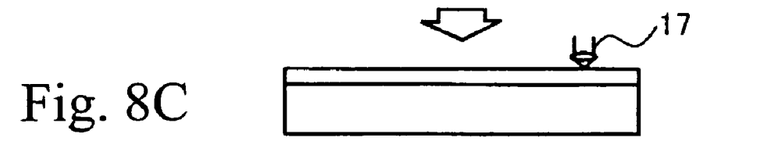
Figure 8D:
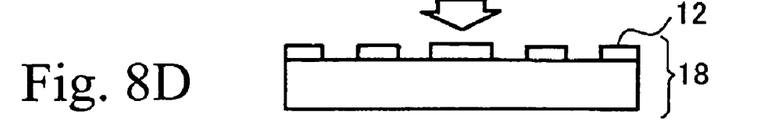

8A), and a resist 11 is applied on the surface of the glass plate 10 (FIG. 8B). Next, a surface of the resist 11 is exposed and cut through a laser beam 17 so that the shape of the track is left (FIG. 8C). The resist 11 is developed and washed to thereby complete a glass plate 18, in which a concave convex track resulting from a resist remainder 12 is formed on the surface (FIG. 8D).

Figure 8E:
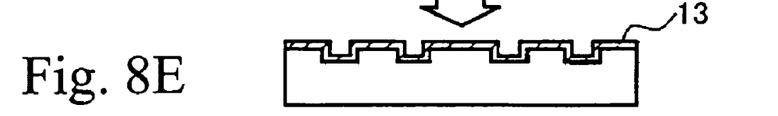
Figure 8F:
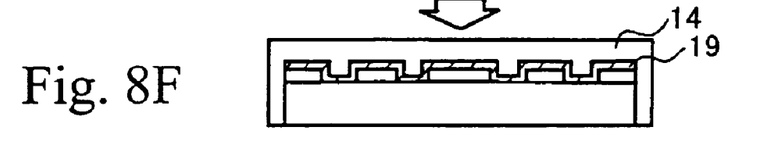

On this track surface of the glass plate 18, as a preparation for an execution of nickel plating, a thin nickel film 13 is deposited, for example, through sputtering non-electrolytic plating and the like. Consequently, the surface is made conductive (FIG. 8E). Then, the nickel plating is performed on the surface to thereby form a nickel plating layer 14 (FIG. 8F).

Figure 8G:
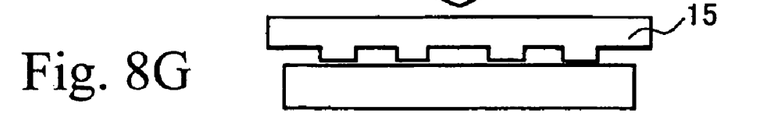
Figure 8H:
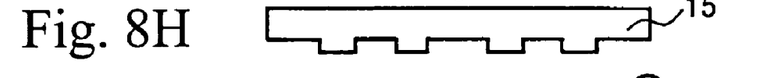

This nickel plating layer 14 is stripped from the glass plate 18, and a washing and a reverse polishing are performed thereon to thereby complete an original disc 15 made of nickel (FIGS. 8G, 8H). Then, the plasma etching process is performed on the entire surface of this original disc 15 made of nickel (FIG. 8I).

The step of producing the shapes of the land and the groove on the original disc material surface in this embodiment (abbreviated as "first step") is the step illustrated at FIGS. 8A to 8H. With regard to this step, various methods of the known techniques can be applied thereto. The nickel plating method described here is one of them. Also, the original disc material is not limited to the above-mentioned nickel material.

Figure 9:
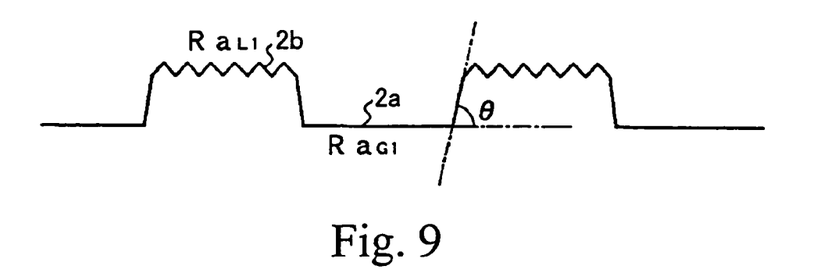
FIG. 9 is a partial schematic cross-sectional view of a transparent disc substrate of an optical information recording medium according to a conventional example.

The original disc 15 made of the nickel completed at the first step is characterized in that since the land surface is plated on the resist surface of the rough surface state, the arithmetic average roughness on the original disc surface corresponding to the land surface is rough. In other words, as schematically shown in a cross-sectional view thereof in FIG. 9, the land surface is at a rougher state than the groove surface, and the balance between the arithmetic average roughness on the original disc surfaces corresponding to the land surface and the groove surface is not good. The optical disc obtained in this case is the conventional example, and it corresponds to the comparative example 2 in the above-mentioned tables 1, 2.

Figure 8I:
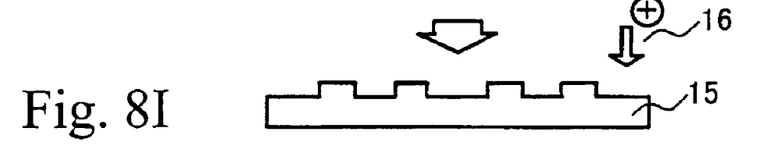

According to the preferred embodiment of the present invention, as shown in FIG. 8I, the plasma etching process is further performed on the original disc material surface on which the shapes of the land and the groove are formed. At this step (hereafter, referred to as a "second step"), the inclination angle of the original disc surface corresponding to the groove surface is set to 25° or more and 40° or less, and both the arithmetic average roughness (Ra) on the original disc surfaces corresponding to the land surface and the groove surface are set to 0.2 to 0.7 nm.

In this embodiment, the plasma etching process uses an apparatus of a parallel flat plate type and a substrate cathode installation type. The used plasma etching gas is Ar gas.

In the example of embodiment 1 and the comparative example 1, an RF power, an Ar gas pressure and a processing time are 150 W, 10 Pa and 3 min (the example of embodiment 1), and 150 W, 10 Pa and 5 min (the comparative example 1), respectively. An etching rate of the nickel film under this condition is about 10 nm/min, and the measurement is done by using an Atomic Force Microscope (AFM).

Figure 10:
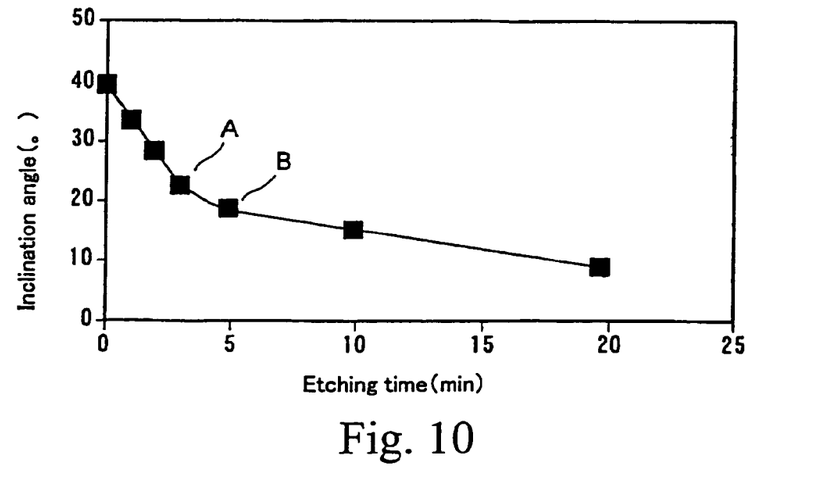
FIG. 10 is a graph showing a relation between plasma etching time in a manufacturing step of an original disc of an optical information recording medium according to a preferred embodiment of the present invention and an inclination angle of an original disc surface corresponding to a groove side.
Figure 11:
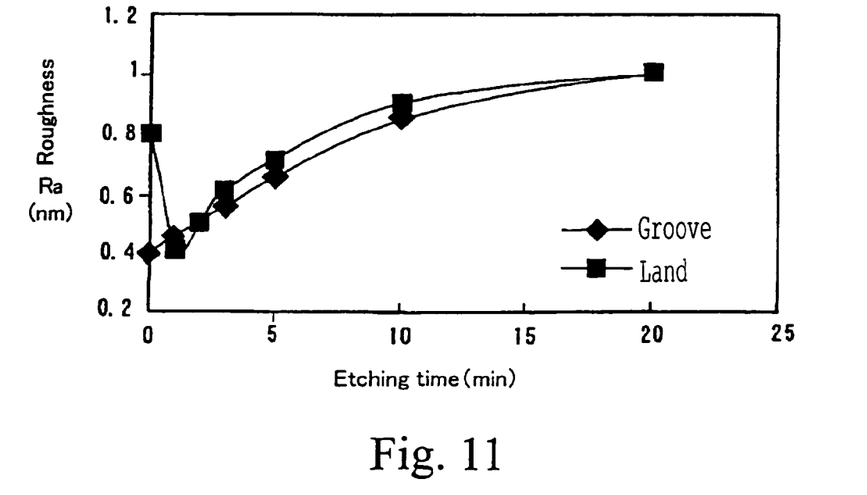
FIG. 11 is a graph showing a relation between plasma etching time in a manufacturing step of an original disc of an optical information recording medium according to a preferred embodiment of the present invention, and arithmetic average roughness on original disc surfaces corresponding to a land surface and a groove surface.

The results of the experiments are shown in FIGS. 10, 11. FIG. 10 is a graph showing the relationship between the plasma etching time according to this embodiment and the inclination angle of the original disc surface corresponding to the groove surface, and FIG. 11 is a graph showing the relation between the plasma etching time according to this embodiment and the arithmetic average roughness on the original disc surfaces corresponding to the land surface and the groove surface.

As shown in FIG. 10, the inclination angle θ of the original disc surface corresponding to the groove side is more obtuse in association with the plasma etching time, because of an angular dependency of an etching speed in an anisotropic etching. The inclination angle is 40° at an initial state. However, for example, it is about 25° (an A-part of FIG. 10) at three minutes in the example of embodiment 1, and 19° (a B-part of FIG. 10) at five minutes of the comparative example 1.

As shown in FIG. 11, the arithmetic average roughness (Ra) on the original disc surfaces corresponding to the land surface and the groove surface are basically located in the direction of the deterioration caused by ion impact. However, the land surface is plated on the resist surface of the rough surface state and formed at the first step. Thus, it is rough at the initial state. For this reason, the arithmetic average roughness is improved at the initial period of the plasma etching process. In short, the arithmetic average roughness on the original disc surface corresponding to the land surface at the initial state, which was rough, is transiently improved by the plasma etching process. After that, if the plasma etching process is continued in its original state, the effect of the plasma etching causes the surface to be rough, namely, the arithmetic average roughness is improved in a monotonously increasing manner.

For this reason, the method of stopping the etching after the elapse of a certain time and maintaining the condition that the arithmetic average roughness on the land and the groove are close to each other contributes to the improvement of the signal quality, such as the improvement of the crosstalk property and the like. In this way, the plasma etching method can be used to control the arithmetic average roughness on the original disc surfaces corresponding to the land surface and the groove surface, and the control of the arithmetic average roughness as mentioned above enables the signal control to be improved.

It has to be noted that in the above-mentioned preferred embodiments, the plasma etching through the Ar gas is used. However, it is possible to use other types of gas, for example, $N_2$, He and $O_2$.

The comparison between the properties of the above-manufactured disc according to the preferred embodiment of the present invention and the disc of the conventional product is illustrated in the above-mentioned table 2. That is, in the example of embodiment 1, the etching time is 3 minutes, and the inclination angle of the groove side is 25°. Thus, the arithmetic average roughness on both of the groove surface and the land surface are suppressed to the low values, and its balance is good. Hence, the signal quality such as the jitter and the like is optimum.

The comparative example 2 is a conventional product, and it is at a state that the plasma etching process according to the preferred embodiment of the present invention is not done. Thus, the inclination angle of the groove side is wide, and the balance between the arithmetic average roughness on the land surface and the groove surface is poor. Thus, although the power margin property is optimum, the jitter and the erasability are poor.

In the comparative example 1, the etching processing time according to the preferred embodiment of the present invention is defined as 5 minutes. Thus, the inclination angle of the groove side is 19°. Hence, the power margin property fell.

As detailed above, the optical information recording medium according to the preferred embodiment of the present invention, the original disc for the optical information recording medium and the method of manufacturing the same can provide the following advantages.

With the optical information recording medium according to the preferred embodiment of the present invention, the recording on both surfaces of the land and the groove can be attained without any drop in the recording quality. In other words, the jitters, the erasability and the power margin properties with regard to both surfaces of the land and the groove can be suitably balanced. Moreover, they can be improved, depending on only the shape, irrespective of the property of the signal recording film. The effect of the optical information recording medium according to the preferred embodiment of the present invention can be especially provided in the MSR method of increasing the recording density in the circumferential direction.

Also, according to the original disc for the optical information recording medium according to the preferred embodiment of the present invention and the method of manufacturing the same, a mass-production of the above-mentioned recording medium can be attained. Also, the plasma etching can be used to easily control the arithmetic average roughness on the original disc surfaces corresponding to the land surface and the groove surface.

What is claimed is:

1. An optical information recording medium comprising:
   both a land and a groove as a recording track on a substrate;
   a first dielectric layer, a signal recording layer, a reproducing layer, a second dielectric layer, a thermal diffusing layer and a protective layer all sequentially provided on the substrate,
   wherein an inclination angle of a groove side of said substrate is 25° or more and less than 40°, and an arithmetic average roughness (Ra) on a land surface and a groove surface of said substrate is 0.2 to 0.7 nm.

2. An optical information recording medium according to claim 1, wherein a difference between the arithmetic average roughness (Ra) on said land surface and said groove surface is 0.2 nm or less.

3. An optical information recording medium according to claim 1, wherein reproduction of information is carried out by using Magnetically Induced Super Resolution (MSR).

* * * * *